United States Patent
Keller (10) Patent No.: US 9,375,609 B2
(45) Date of Patent: Jun. 28, 2016

(54) ROPE CLAMP SYSTEM

(71) Applicant: Landscape Structures Inc., Delano, MN (US)

(72) Inventor: Thomas L. Keller, Delano, MN (US)

(73) Assignee: Landscape Structures Inc., Delano, MN (US)

( * ) Notice: Subject to any disclaimer, the term of this patent is extended or adjusted under 35 U.S.C. 154(b) by 14 days.

(21) Appl. No.: 14/515,880

(22) Filed: Oct. 16, 2014

(65) Prior Publication Data

US 2015/0119199 A1  Apr. 30, 2015

Related U.S. Application Data

(60) Provisional application No. 61/896,455, filed on Oct. 28, 2013.

(51) Int. Cl.
| | |
|---|---|
| *A63B 22/12* | (2006.01) |
| *A63B 29/02* | (2006.01) |
| *A63B 9/00* | (2006.01) |
| *F16G 11/06* | (2006.01) |
| *F16B 2/12* | (2006.01) |

(52) U.S. Cl.
CPC . *A63B 29/02* (2013.01); *A63B 9/00* (2013.01); *F16G 11/06* (2013.01); *A63B 2009/004* (2013.01); *A63B 2208/12* (2013.01); *F16B 2/12* (2013.01); *Y10T 29/49959* (2015.01)

(58) Field of Classification Search
USPC ............ 482/1–148; 248/67.5; 29/525.08
See application file for complete search history.

(56) References Cited

U.S. PATENT DOCUMENTS

| | | | | | |
|---|---|---|---|---|---|
| 4,097,169 | A * | 6/1978 | Kelly | ........................ | F16B 2/10 135/119 |
| 4,169,652 | A * | 10/1979 | Hockele | .................. | H01R 4/38 439/776 |
| 5,738,552 | A * | 4/1998 | Halbach | ............... | H01R 11/281 439/762 |
| 5,743,820 | A * | 4/1998 | Espinosa | ............ | A63B 69/0079 473/429 |
| 6,126,490 | A * | 10/2000 | Anderson, Jr. | ......... | H01R 23/27 439/652 |
| 6,595,472 | B1 * | 7/2003 | Pisczak | ................. | H02G 7/053 248/74.1 |
| 7,175,548 | B2 * | 2/2007 | McNulty | ............ | A63B 69/0071 473/421 |
| 8,031,472 | B2 * | 10/2011 | Bicket | ................. | H05K 5/0247 345/157 |
| 8,526,180 | B2 * | 9/2013 | Rayner | ................ | G06F 1/1626 206/320 |

(Continued)

OTHER PUBLICATIONS

"Quality Characteristics" COROCORD Raumnetz GmbH, Retrieved at <<www.corocord.com>> Copyright 2010 by COROCORD Raumnetz GmbH, 4 pages.

*Primary Examiner* — Stephen Crow
(74) *Attorney, Agent, or Firm* — Katherine M. Scholz; Kelly, Holt & Christenson, PLLC (57) ABSTRACT

Rope clamps and methods for attaching rope clamps to climbing structures are provided. Rope clamps illustratively comprises a clamp portion configured to be attached to a climbing structure, wherein the clamp portion comprises a clamp body, a cover, a rope path and a fastener. The clamp body is configured to engage a portion of the climbing structure. The cover is configured to engage with a front of the clamp body. The rope path extends between the clamp body and the cover. The fastener is configured to attach the cover to the clamp body. Further, at least one rope configured to enter the rope path at a first point, extend through the rope path and exit the rope path at a second point.

13 Claims, 6 Drawing Sheets

(56) References Cited

U.S. PATENT DOCUMENTS

| | | | |
|---|---|---|---|
| 8,925,279 B2 * | 1/2015 | Pantelides | E01D 19/16 52/223.1 |
| 9,025,317 B2 * | 5/2015 | Richardson | H04M 1/0252 361/679.01 |
| 2007/0191844 A1 * | 8/2007 | Carls | A61B 17/705 606/86 A |
| 2009/0039125 A1 * | 2/2009 | Bock | B62J 11/00 224/275 |
| 2009/0265972 A1 * | 10/2009 | Chang | A47G 1/06 40/771 |
| 2014/0175233 A1 * | 6/2014 | Han | H02G 3/32 248/74.1 |
| 2014/0243119 A1 * | 8/2014 | Whalen | A63B 1/02 473/493 |
| 2015/0060634 A1 * | 3/2015 | Munot | H02G 7/053 248/636 |

* cited by examiner

ROPE CLAMP SYSTEM

CROSS-REFERENCE TO RELATED APPLICATION

The present application claims the priority of provisional application Ser. No. 61/896,455, filed on Oct. 28, 2013, the content of which is hereby incorporated by reference in its entirety.

BACKGROUND

Play structures, and rope based climbing structures are known in the art. A known problem facing outdoor climbing structures is that of ropes fraying or breaking as a result of wear and tear. One cause of this wear and tear is the strain placed on the ropes as a result of tight angles, or pinch points, created in securing the ropes to structures.

The prior art includes mechanisms to affix lengths of rope to a structure. The most common and simple way to affix a rope or cable to a play structure is by fixing the rope to a pole or tubing on the structure. However, the direct fixture introduces uneven strain on the rope and raises the likelihood of fraying. A limitation of this and other such approaches is the wear and tear on ropes at pinch points in a play structure configuration. One known solution to the pinching problem is to use multiple lengths of rope at a single corner, in order to avoid the stress of a single rope bent at an acute angle.

SUMMARY

Rope clamps and methods for attaching rope clamps to climbing structures are provided. Rope clamps illustratively comprises a clamp portion configured to be attached to a climbing structure, wherein the clamp portion comprises a clamp body, a cover, a rope path and a fastener. The clamp body is configured to engage a portion of the climbing structure. The cover is configured to engage with a front of the clamp body. The rope path extends between the clamp body and the cover. The fastener is configured to attach the cover to the clamp body. At least one rope is configured to enter the rope path at a first point, extend through the rope path and exit the rope path at a second point.

These and various other features and advantages that characterize the claimed embodiments will become apparent upon reading the following detailed description and upon reviewing the associated drawings.

DETAILED DESCRIPTION OF ILLUSTRATIVE EMBODIMENTS

Figure 1:
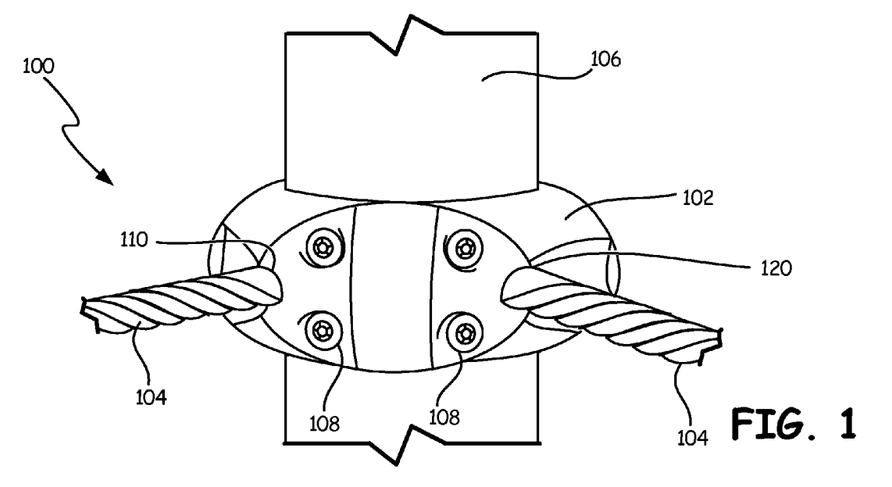
FIG. 1 is a front view of a rope clamp system mounted on a pole according to one embodiment.

FIG. 1 is a front view of a rope clamp system mounted on a pole according to one embodiment. Rope clamp system 100 comprises a clamp 102 that receives a rope 104 at a first point 110 and the rope 104 exists at second point 120. The first point 110 and second point 120 are spaced apart on clamp 102 such that the angles of entry and exit are configured such that they reduce the strain on a rope at a single point by spreading the strain to two separate points at various angles, and in some embodiments, at obtuse angles. Further, the first and second points are, as shown FIG. 1, along an axis parallel to the top and bottom of the rope clamp system.

Rope clamp system 100 is configured to be attachable to a pole 106 such that rope clamp system 100 does not move along the pole but is fixably attached to the pole through the rope clamp system 100 such that even pressure is applied along a full length of contact area between a rope 104 and the rope clamp system 100. A problem in play structures for children that involve ropes is due to fraying or stress on such ropes. This fraying can, in some circumstances, cause breakages. The breakages can present a danger to children playing on such systems that may not be easily detected by visual inspection of the equipment until after a breakage occurs. As can be seen in FIG. 1, rope clamp system 100 allows for the rope 104 to enter rope clamp 102 at a first point 110 and leave the rope clamp 102 at a second point 120, creating two angles to spread the stress of the crossing across the full contact area between the rope 104 and the rope clamp 102. instead of a single point. This configuration results in the desired angle at the rope crossing point, with a reduced pressure on the rope 104, thus reducing wear and lessening the likelihood of fraying or breakage. The rope clamp system 100 can be configured, in some embodiments, such that a variety of desired angles are available to create other climbing structure configurations by adjusting the location of the rope clamp 102 along the length of the pole 106.

Figure 2A:
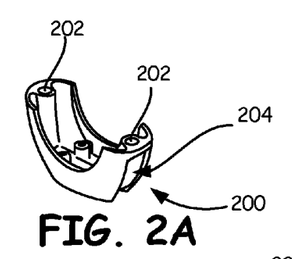
FIG. 2A is a perspective view of a portion of a rope clamp system according to one embodiment.
Figure 2B:
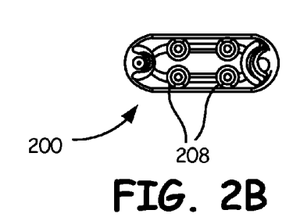
FIG. 2B is a rear elevation view of a front portion of the rope clamp system according to one embodiment.
Figure 2C:
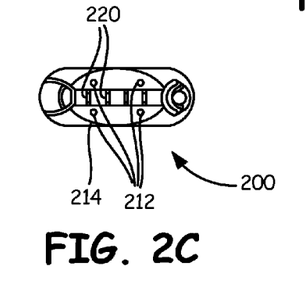
FIG. 2C is a front elevation view of the rope clamp system with a front cover attached according to one embodiment.

FIGS. 2A, 2B, and 2C show interior views of the rope clamp 102 shown in FIG. 1. FIG. 2A illustrates a perspective view of rope clamp portion 200 in accordance with one embodiment. FIG. 2B shows a rear view of a front portion of a rope clamp portion 200. FIG. 2C shows a front elevation view of FIG. 2C without the front cover attached in accordance with one embodiment. Rope clamp portion 200 comprises connection points 202 and a rope path 204. Connection points 202 allow a first rope clamp portion 200 to be attached to a second rope clamp portion 200 such that, as shown in FIG. 1, the rope clamp system 102 encircles the entirety of a pole or other cylindrical structure, such as a pipe. However, these connectors 202 also allow for the rope clamp system to be attached such that it engages a wall or other portion of a climbing structure, thus not requiring a second rope clamp portion 200 in accordance with another embodiment. Rope path 204 shows where the rope engages a front cover of the rope clamp portion 200. The front cover engages rope clamp portion 200, fixing the rope 104 within the rope clamp portion 200 at a location comprising the bottom of the rope clamp portion 200 of FIG. 2A.

FIG. 2B shows a rear view of a front portion of rope clamp portion 200. FIG. 2B illustrates that four fastener receivers 208 are included in the illustrated particular embodiment. However, in an alternative embodiment, only one or two fastener receivers 208 are used and additionally, in alternative embodiments, more fastener receives 208 could also be used to hold the front cover 214 in place on the rope clamp portion 200. The fastener receivers 208 engage fasteners passing through the front cover 214 of the rope clamp portion 200, thus securing a rope 104 to the rope clamp portion 200. FIG. 2C shows the rope clamp portion 200 of FIG. 2B, wherein the front portion is attached over the rope clamp portion 200. In one particular embodiment, the fasteners 212 securing the front cover 214 to the rope clamp portion 200 may comprise screws, in one embodiment. In one embodiment, the screw comprises threads along an entire length. In another embodiment, bolts could be used with or without an accompanying nut. However, such fasteners could also comprise any suitable removable fastening device.

Fastener receivers 208, in one embodiment, also perform an anti-slip function. Once a rope 104 is engaged within the rope clamp portion 200, it is important to ensure that the rope does not slip substantially once attached to a pole 106. The fastener receivers 208, in addition to receiving a fastening mechanism, are also configured to engage the rope 104 within the rope clamp portion 200 such that the fastener receivers provide pressure on the rope 104, keeping the rope 104 substantially in place within the rope clamp portion 200.

Figure 3A:
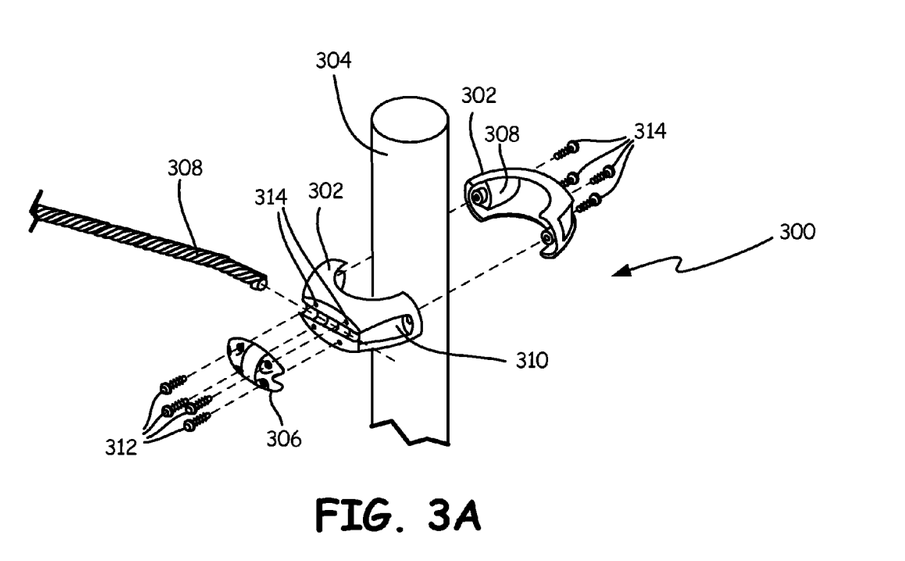
FIG. 3A is an exploded rear-view of a rope clamp system mounted on a pole according to one embodiment.
Figure 3B:
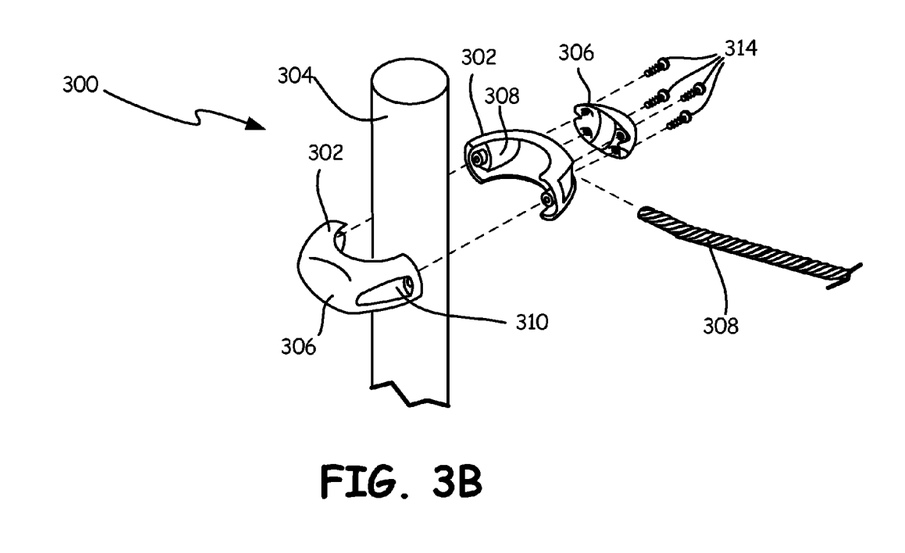
FIG. 3B is an exploded view of a rope clamp system mounted on a pole according to one embodiment.

FIGS. 3A and 3B shows an exploded view of a rope clamp system 300 where two rope clamps are being attached to a pole 304. In FIG. 3A, two rope clamp portions 302 can be used to substantially encircle the pole 304, such that they can be attached to each other by portion fastener 314. Only one portion fastener 314 is shown in FIG. 3A, however, more or fewer portion fasteners 314 could be used. For example, in another embodiment, two portion fasteners 314 are used on either end of the rope clamp portion 302. Additionally, in a further embodiment, four portion fasteners 314 could be used such that two portion fasteners 314 are positioned on either side of the rope clamp portion 302.

After the rope clamp portions 302 are attached to the pole 304, the front cover 306 is put into place such that a rope 308 is positioned between the rope clamp portion 302 and the front cover 306. Once the rope 308 is placed between the holder fastener 312 and the rope clamp portion 302, holder fasteners 312 are used to hold the rope clamp holder and the rope clamp portion 302 together. In one embodiment, the rope 308 is immovably fixed between the rope clamp portion 302 and the front cover 306.

FIG. 3A also shows anti-slide mechanisms 320, configured such that, when engaged with holder fasteners 312, they substantially prevent rope 308 from sliding through the rope clamp portion 302. In one embodiment, each rope clamp portion 302 includes eight anti-slide mechanisms 320, with four placed on the back of the rope clamp holder and a corresponding four placed on the rope clamp portion 102 opposite those placed on the back of the rope clamp holder. However, in another embodiment, the anti-slight mechanisms 320 on the back of the rope clamp holder are staggered from those on the back of the rope clamp portion 102. However, in another embodiment, the rope clamp portion 302 may comprise six or eight anti-slide mechanisms 320. In a further embodiment, the rope clamp portion 302 may only comprise two anti-slide mechanisms 314. In another embodiment, anti-slide mechanisms 320 are placed only on the back of the rope clamp holder. In a further embodiment, anti-slide mechanisms 320 are placed only on the rope clamp portion 302.

As shown in FIG. 3A, in one embodiment, the holder fasteners 312 are bolts; in another embodiment, they are screws. As is shown in FIG. 3A, this configuration has not one stress point on the rope 308, but spreads the pressure along the length of the rope 308 across the full contact area between the rope 308 and the rope clamp portion 302. The full contact area, in one embodiment, extends from a first point 316, where rope 302 enters the rope clamp portion 302, and a second point 318, where rope 308 exits the rope clamp portion 302. In this way, the pressure is spread across the full contact area, instead of at a single contact point, thus allowing the system to be durable for a longer period of time and limiting the risk of the rope breaking. Additionally, the configuration shown in FIG. 3A, keeps the rope 308 at two various angles, in one embodiment the rope may be kept at one of a plurality of angles (one at entry and one at exit) of the rope clamp portion 302, as opposed to one smaller angle, thus, again, acting as a means to reduce the stress and the strain, and the wear and tear on the rope 308. This configuration allows for a safer and more durable rope clamp system for a play structure. This is particularly important for play structures that are positioned outside as they undergo considerably more strain as a result of weather and wearing.

Figure 3C:
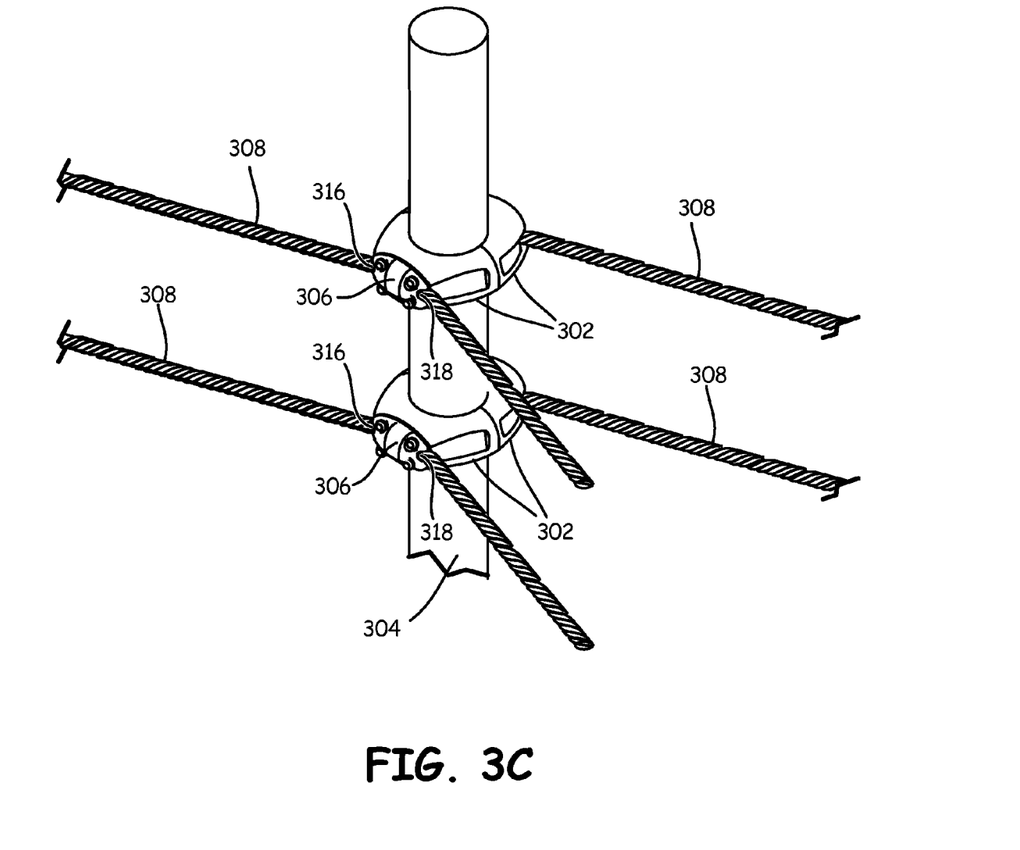
FIG. 3C is a plurality of rope clamp systems mounted on a pole according to one embodiment.

Up until this point, only a single rope clamp system has been illustrated. However, FIG. 3C shows a plurality of rope clamp systems 300 attached to a single pole 304. As shown in FIG. 3C, a plurality of ropes 308 may enter and exit the same rope clamp system 300, or only a single rope 308 may be used in a rope clamp system 300. This versatility of having two ropes enter and exit a single rope clamp system 300 on a single pole, allows for significantly improved versatility in creating a play structure with a limited set of poles 304 and ropes 308. However, in another embodiment, a rope clamp system 300 may only accommodate a single rope 308, as shown in FIG. 3C. Additionally, the same rope 308 may go through multiple rope clamp systems 300 on a single play structure. Further, in another embodiment where the rope clamp covers 306 and rope clamp portions 302 are removeable, the system allows for a variety of rope-based climbing structures are possible. In this way, the rope clamp portions 302 present a modular approach to rope climbing structure creation, allowing for each climbing structure created to be as unique as desired.

Figure 4A:
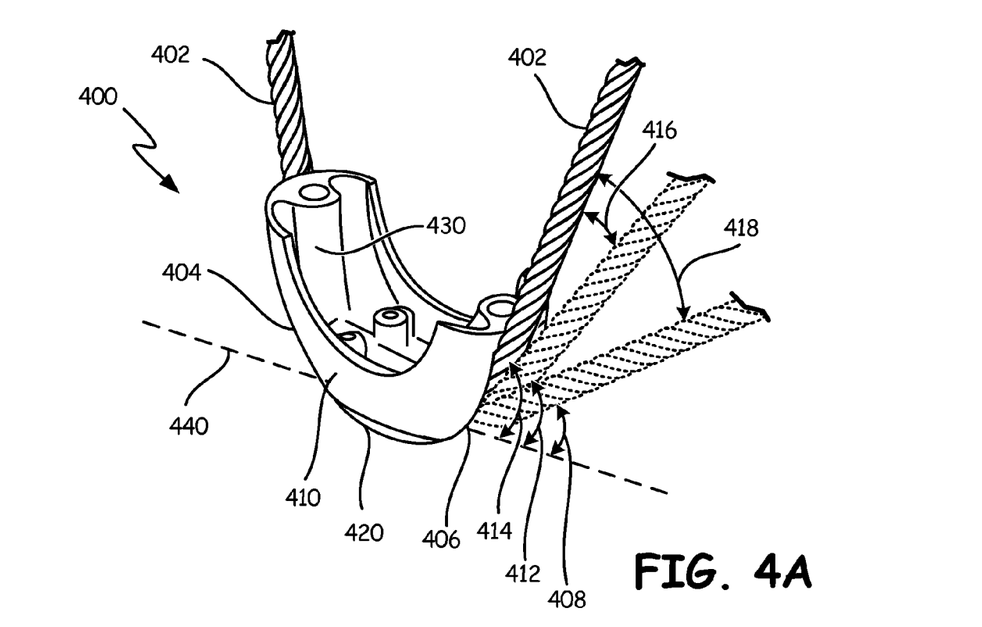
FIG. 4A is a perspective view of a rope clamp portion with a rope according to one embodiment.
Figure 4B:
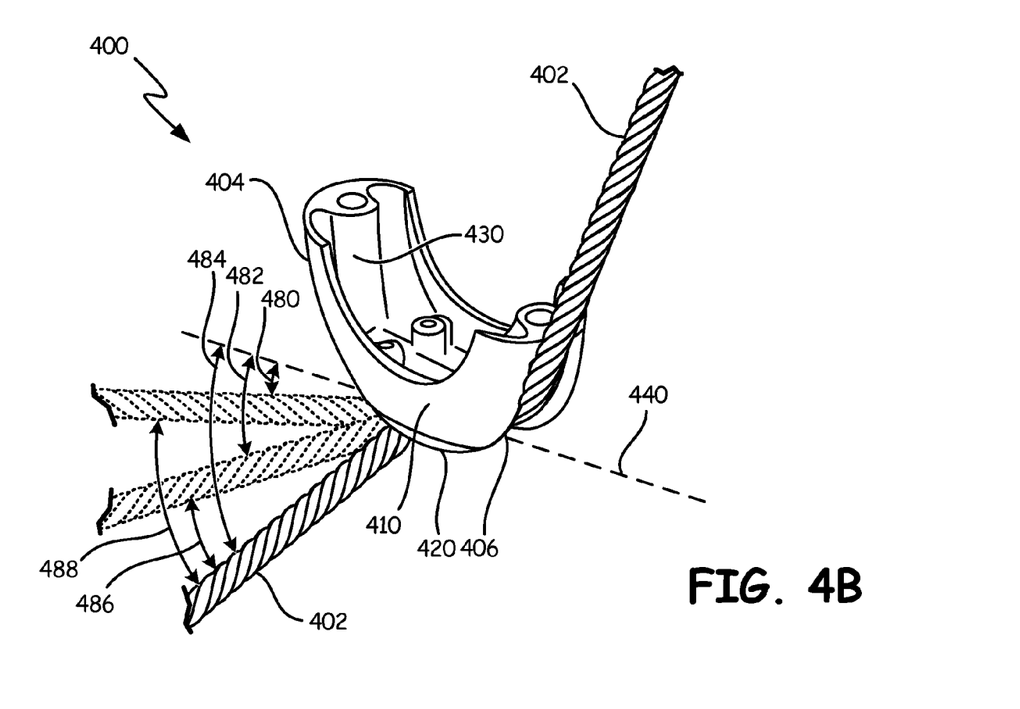
FIG. 4B is a perspective view of a rope clamp portion with a rope according to one embodiment.

FIGS. 4A and 4B are perspective views of a rope clamp system 400 that includes a rope clamp portion 410 with rope 402 according to one embodiment. FIG. 4A shows rope 402 entering the rope clamp portion 410 at a first point 404 and leaving at a second point 406. One advantage of the configuration of rope clamp portion 410 is that it provides considerable flexibility with respect to the positioning of the rope 402, while reducing strain on the rope 402. For example, in one embodiment, the rope 402 is easily moved between a first position to a second position or a third position, as shown in FIG. 4A. The first position is associated with a first angle 414, where angle 414 is defined with respect to an imaginary axis 440 that runs through the front cover 420 of the rope clamp system 400. The first position is also defined such that, in the first position, the rope 402 engages substantially with a side of the rope clamp portion 400. In one embodiment, the side of the rope clamp portion is a groove 430, where the groove 430 provides a position for the rope 402 such that, when stretched, the rope substantially remains within the groove 430. The second position is associated with a second angle 412, located a distance 416 from the first position. The third position is defined as located a distance 418 from the first position, at an angle 408 from the imaginary axis 440. As shown in FIG. 4A, an angle of an entering side of a rope 402 does not need to be the same as an angle of an existing side of the rope 402.

Figure 4C:
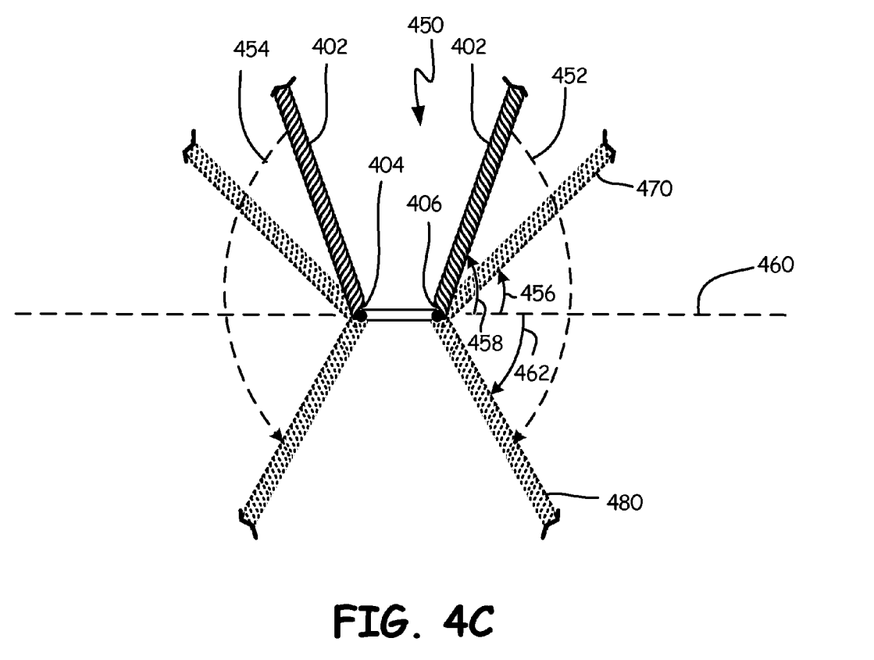
FIG. 4C is a diagrammatic view of a rope positioning within a rope clamp system according to one embodiment.

FIG. 4C is a diagrammatic view of a rope 402 positioning within a rope clamp system 450 according to one embodiment, where the rope clamp portion 410 is not shown. A full range of motion is available for both an entering side of a rope 402 and an existing side of the rope 402. In one embodiment, the entering side of rope 402 has a range of motion 452, while the exiting side of rope 402 has a range of motion 454. Range of motion 452 and range of motion 454 may, in one embodiment, be different according to limitations of the rope clamp portion 410. The entering portion of rope 402 is shown in FIG. 4C moving between a first position, defined by an angle 458, a second position 470 defined by angle 456, and a third position defined by an angle 462. However, these three positions are merely exemplary, and a rope clamp system 450 could, in one embodiment, incorporate any position within a range of motion allowed by the rope clamp system 450. FIG. 4C also shows the first, second and third positions with respect to an imaginary axis 460 that runs through a front cover of a rope clamp system 450. As shown in FIG. 4C, positions of a rope 402 within the rope clamp system 450 are not limited to positions above or below the imaginary axis 460. The benefit of the rope clamp system 450, that includes an entry point 404 and an exit point 406, is that the pressure on the rope 402 is spread across the entire contact area between the rope 402 and the rope clamp system 450, regardless of the position the rope 402 takes within the ranges of motion of the entry portion and the exit portion of rope 402.

Figure 5:
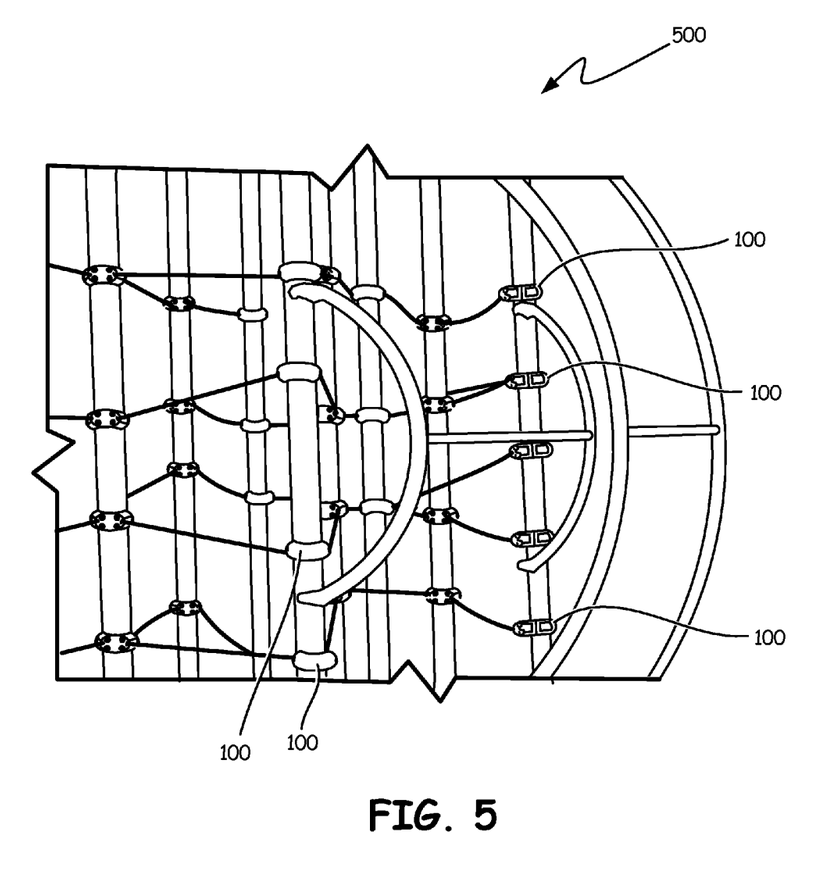
FIG. 5 is a diagrammatic view of a portion of a climbing structure consisting of multiple rope clamp systems in accordance with one embodiment.

FIG. 5 shows a climbing structure 500 composed of a plurality of rope clamp systems 100, wherein multiple rope clamp systems 100 are attached to a single pole (as shown in FIG. 5) and additionally, where a single rope goes through a plurality of rope clamp systems within the same structure. The ability to use these rope clamp systems 100 throughout an entire play structure and to accommodate multiple ropes 104, allows for the creation of a compact climbing structure 400 that presents a child or other user with considerable quantity of play options within a single space.

Although the present invention has been described with reference to preferred embodiments, workers skilled in the art will recognize that changes may be made in form and detail without departing from the spirit and scope of the invention.

What is claimed is:

1. A rope clamp system, the system comprising:
    a clamp portion configured to be attached to a climbing structure, wherein the clamp portion comprises:
        a clamp body configured to engage a portion of the climbing structure;
        a cover configured to engage with the clamp body;
        a rope path extending between the clamp body and the cover; and
        a fastener configured to attach the cover to the clamp body; and
    at least one rope passing through the rope path at first and second points, wherein the first and second points are spaced apart.

2. The rope clamp system of claim 1, wherein the rope clamp system comprises two clamp portions, and wherein the two clamp portions are fastened together.

3. The rope clamp system of claim 2, wherein the two clamp portions are fastened together such that they substantially encircle the portion of the climbing structure.

4. The rope clamp system of claim 1, wherein the rope extends through a plurality of clamp portions.

5. The rope clamp system of claim 1, wherein a plurality of fasteners attach the cover to the clamp body.

6. The rope clamp system of claim 5, wherein the plurality of fasteners are screws.

7. The rope clamp system of claim 1, wherein the clamp portion is a first clamp portion and wherein a second clamp portion is fastened to the first clamp portion.

8. The rope clamp system of claim 7, wherein the first and second clamp portions are fastened together by screws.

9. The rope clamp system of claim 7, wherein the second clamp portion comprises:
    a second clamp body configured to engage a second portion of the climbing structure;
    a second cover configured to engage with a second front of the second clamp body;
    a second rope path extending between the second clamp body and the second cover; and a second fastener configured to attach the second cover to the second clamp body; and
    wherein a second rope extends through the second rope path.

10. A climbing structure, comprising:
    a pole;
    a rope;
    a plurality of rope clamps each comprising:
        a first clamp portion and a second clamp portion, wherein the first clamp portion is configured to be connected to the second clamp portion; and
        a front cover, wherein the front cover is configured to engage with the first clamp portion such that the rope extends through a rope path between the front cover and the first clamp portion; and
    wherein one rope clamp is fixed to the pole such that the first clamp portion and the second clamp portion are fastened together such that they substantially encircle the pole.

11. The climbing structure of claim 10, and further comprising a second rope and a second front cover, wherein the second front cover is configured to engage with the second clamp portion such that the second rope extends through a second rope path between the second front cover and the second clamp portion.

12. The climbing structure of claim 11, wherein the second rope is fixed between the second cover and the second clamp portion such that the rope is not slideably moveable.

13. The climbing structure of claim 10, wherein the front cover is fixed to the first clamp portion by a series of fasteners.

* * * * *